United States Patent
Li et al.

(10) Patent No.: US 8,991,838 B2
(45) Date of Patent: Mar. 31, 2015

(54) STROLLER FRAME WITH AN AUTOMATIC BRAKE MECHANISM ACTUATABLE BY HAND DETECTING

(71) Applicant: Lerado (Zhong Shan) Industrial Co., Ltd.

(72) Inventors: Wei-Yeh Li, Tainan (TW); Tsung-Li Wu, Chiayi (TW)

(73) Assignee: Lerado (Zhong Shan) Industrial Co., Ltd., Zhong Shan (CN)

( * ) Notice: Subject to any disclaimer, the term of this patent is extended or adjusted under 35 U.S.C. 154(b) by 0 days.

(21) Appl. No.: 13/971,533

(22) Filed: Aug. 20, 2013

(65) Prior Publication Data

US 2014/0346746 A1  Nov. 27, 2014

(30) Foreign Application Priority Data

May 23, 2013 (CN) .......................... 2013 1 0193139
May 23, 2013 (CN) ...................... 2013 2 0284114 U

(51) Int. Cl.
*B62B 9/08* (2006.01)
*B62B 9/20* (2006.01)
*B62B 5/04* (2006.01)

(52) U.S. Cl.
CPC ............... *B62B 9/085* (2013.01); *B62B 5/0414* (2013.01); *B62B 5/0461* (2013.01); *B62B 9/087* (2013.01); *B62B 9/20* (2013.01)
USPC ...................................................... 280/47.38

(58) Field of Classification Search
CPC .... B60R 25/20127; B62B 9/08; B62B 9/087; B60T 7/14; B60T 7/12
USPC .......... 280/47.38, 642; 188/156, 161, 171, 20
See application file for complete search history.

(56) References Cited

U.S. PATENT DOCUMENTS

| 5,012,165 | A | * | 4/1991 | Lautzenhiser et al. | 318/53 |
| 6,742,791 | B2 | * | 6/2004 | Lan | 280/62 |
| 7,445,069 | B2 | * | 11/2008 | Negoro et al. | 180/181 |
| 8,616,573 | B1 | * | 12/2013 | Storch | 280/250.1 |
| 2007/0051566 | A1 | * | 3/2007 | Marlow | 188/20 |
| 2012/0280935 | A1 | * | 11/2012 | Romero | 345/174 |
| 2013/0213749 | A1 | * | 8/2013 | Li et al. | 188/156 |
| 2014/0196991 | A1 | * | 7/2014 | Fite | 188/69 |

* cited by examiner

Primary Examiner — J. Allen Shriver, II
Assistant Examiner — Brian Cassidy
(74) Attorney, Agent, or Firm — Muncy, Geissler, Olds & Lowe, P.C.

(57) ABSTRACT

A stroller frame with an automatic brake mechanism actuatable by hand detecting includes at least a first rear wheel, a first locking mechanism, a second rear wheel, a second locking mechanism, a battery and a hand-detecting handle. The hand-detecting handle is capable of detecting the caregiver's hand by a change of capacitance on its surface, generating a first control signal to a power supply circuit when the caregiver's hand is near, and generating a second control signal to the power supply circuit when the caregiver's hand is absent. The power supply circuit may provide currents in different direction to the first locking mechanism and the second locking mechanism according to the first control signal and the second control signal, so as to lock the rear wheels once the caregiver's hand has left the hand-detecting handle, and unlock the rear wheels when the caregiver's hand near the hand-detecting handle automatically.

15 Claims, 13 Drawing Sheets

STROLLER FRAME WITH AN AUTOMATIC BRAKE MECHANISM ACTUATABLE BY HAND DETECTING

BACKGROUND OF THE INVENTION

1. Field of the Invention

The present invention relates a stroller frame with a brake mechanism, especially to a brake mechanism can lock and unlock the rear wheels of a stroller automatically by detecting a caregiver's hand whether near or left the handle of the stroller.

2. Description of the Related Art

To lock and unlock rear wheels of a traditional stroller, users are always needed to operate the brake mechanism either by hand to actuate or by foot to step downward on each side of the stroller separately.

For instance, some of the known brake mechanisms can be mounted on traditional stroller included two pedals featured by each being formed with a latch portion, and each of the rear wheels being correspondingly formed with a toothed portion for engaging with the latch portion. By stepping downward on the pedals mounted on both sides of the stroller, may drive the latches portion to engage with a corresponding toothed portion of the rear wheel respectively so as lock the rear wheels.

Once the stroller is stayed on a hill or relative higher place and the user forget to lock the rear wheels, or one side of the brake mechanism has been failed to lock its respective rear wheel, would endanger the baby occupant in the stroller, as the stroller may roll away toward the driveway by gravity of itself, or may roll and fall into a side ditch when the caregiver's hand being unintentionally left the handle of the push bars.

SUMMARY OF THE INVENTION

For avoiding the aforementioned accident to the baby occupant due to the caregiver's hand unintentionally left the handle, the present invention provides a stroller frame with an automatic brake mechanism actuatable by hand detecting, including at least a first rear wheel, a first locking mechanism, a second rear wheel, a second locking mechanism, a battery and a hand-detecting handle.

The hand-detecting handle is capable of detecting the caregiver's hand by a change of capacitance on its surface, generating a first control signal to a power supply circuit when the caregiver's hand is near, and generating a second control signal to the power supply circuit when the caregiver's hand is absent.

The power supply circuit may provide currents in different direction to the first locking mechanism and the second locking mechanism according to the first control signal and the second control signal, so as to lock the rear wheels once the caregiver's hand has left the hand-detecting handle, and unlock the rear wheels when the caregiver's hand near the hand-detecting handle automatically.

By adopting the automatic brake mechanism onto a stroller frame according to the present invention, may prevent the stroller from the aforementioned danger for the baby occupant.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
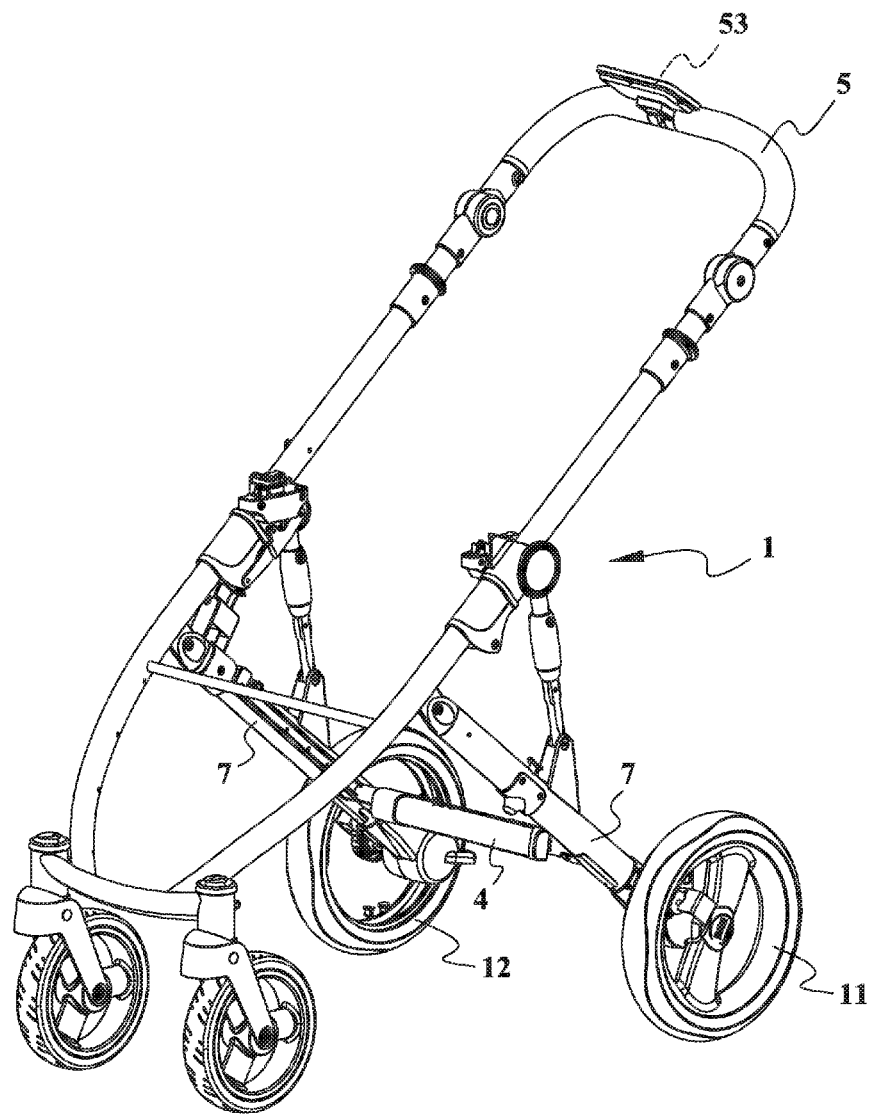
FIG. 1 is a front and left perspective view depicting a stroller frame with an automatic brake mechanism according to the present invention.
Figure 2:
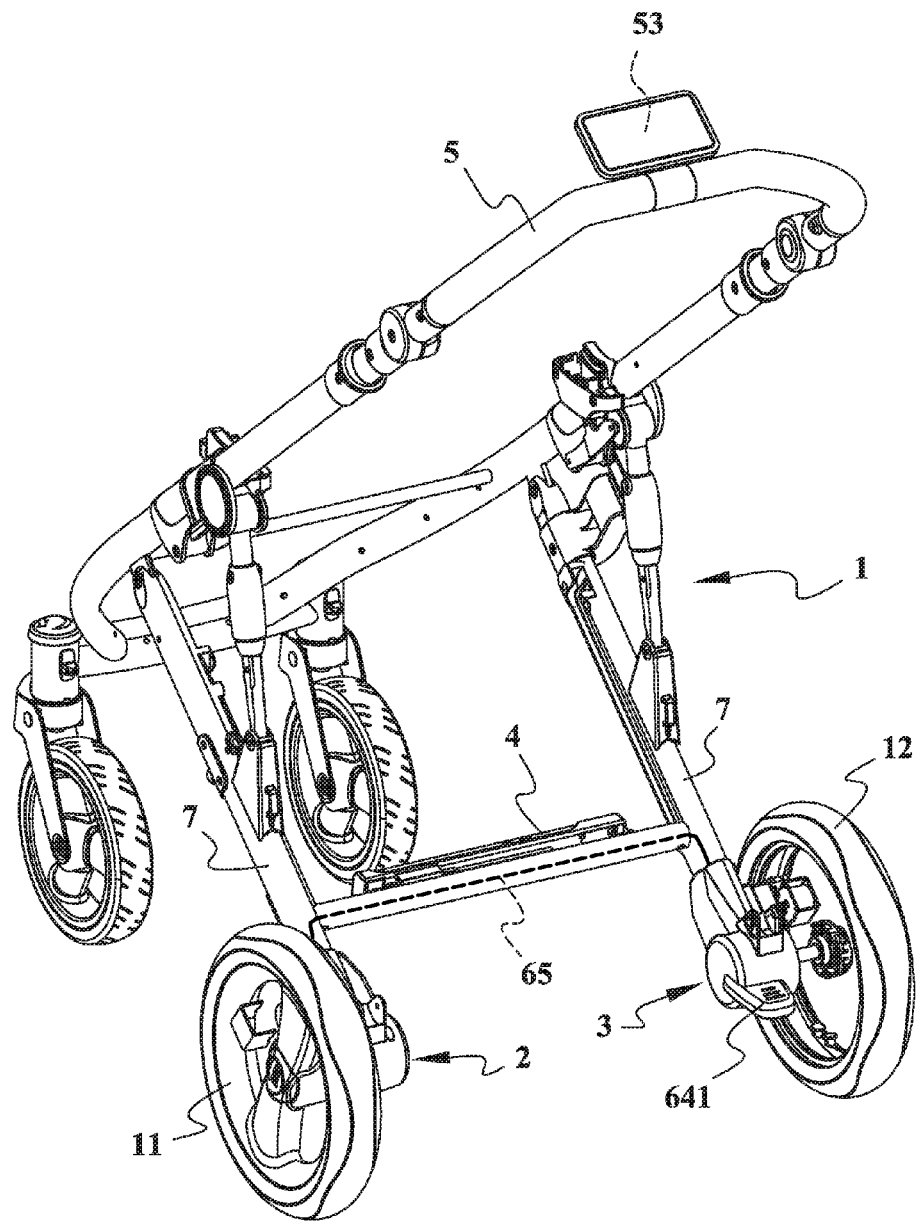
FIG. 2 is a rear and left perspective view depicting a stroller frame with an automatic brake mechanism according to the present invention.

Referring to FIGS. 1 and 2, an embodiment of a stroller frame with an automatic brake mechanism actuatable by hand detecting according to the present invention, may include at least a first rear wheel 11, a first locking mechanism 2, a second rear wheel 12, a second locking mechanism 3, a battery 4 and a hand-detecting handle 5.

Referring to FIGS. 3 to 11, the first rear wheel 11 is rotatably mounted on a rear strut (7) at a first side of the stroller frame 1 and formed with a plurality of positioning holes 110.

The first locking mechanism 2 has a first electromagnet 21 and a first locking pin 22 driven by the first electromagnet 21 for engaging with and disengaging from the positioning holes 110 of the first rear wheel 11 so as to lock and unlock the first rear wheel 11.

Referring to FIGS. 3 to 12, the second rear wheel 12 is rotatably mounted on another rear strut (7) at a second side of the stroller frame 1 and formed with a plurality of positioning holes 120.

The second locking mechanism 3 has a second electromagnet 31 and a second locking pin 32 driven by the second electromagnet 31 for engaging with and disengaging from the positioning holes 120 of the second rear wheel 12 so as to lock and unlock the second rear wheel 12.

Figure 4:
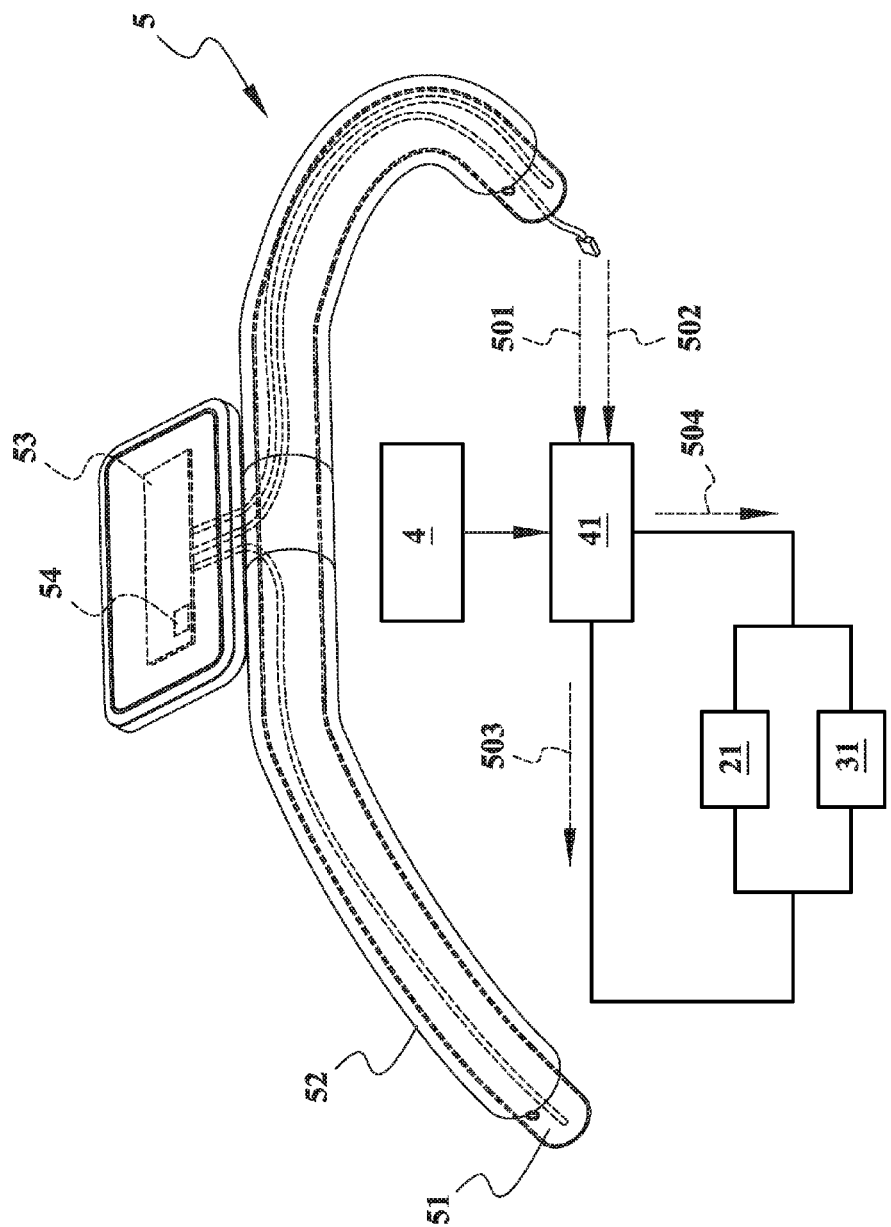
FIG. 4 is a schematic view illustrating how the hand-detecting handle controls the locking mechanisms by providing currents in different directions.
Figure 5:
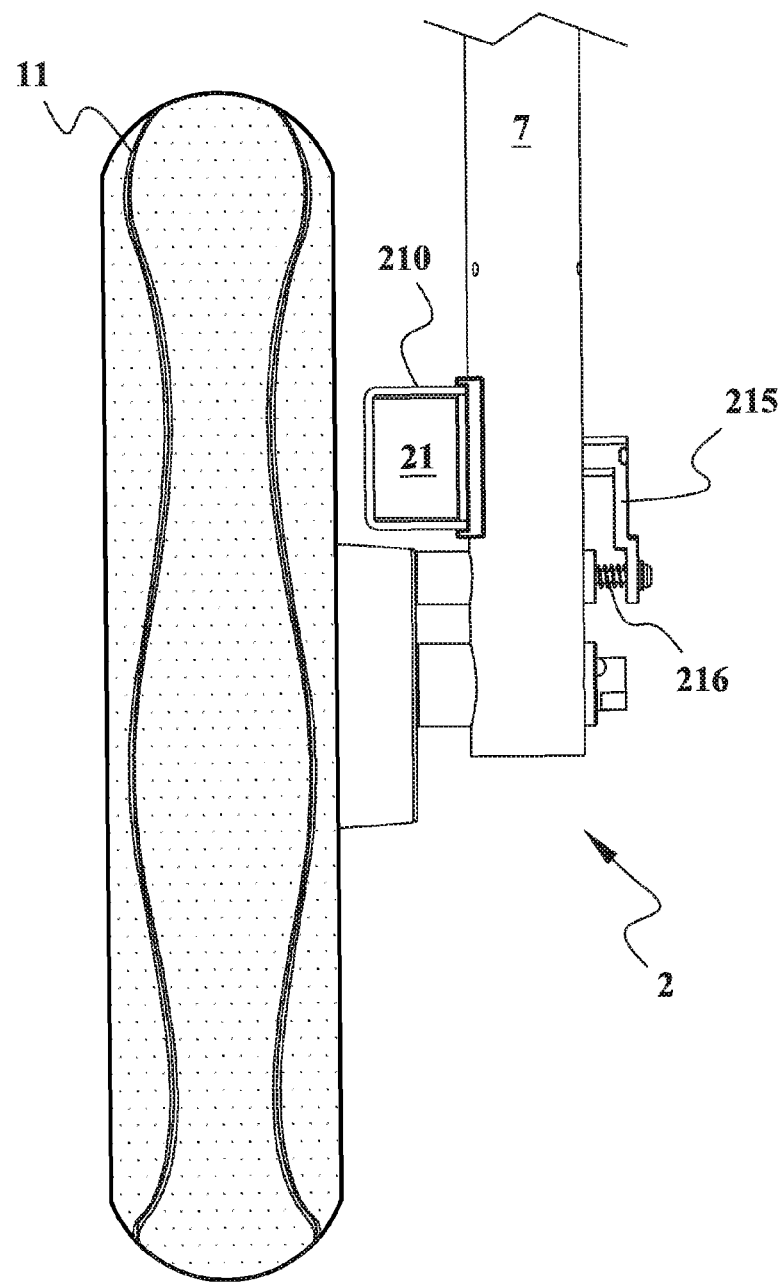
FIG. 5 is an elevational view depicting the relation between the first locking mechanism and a first rear wheel.
Figure 6:
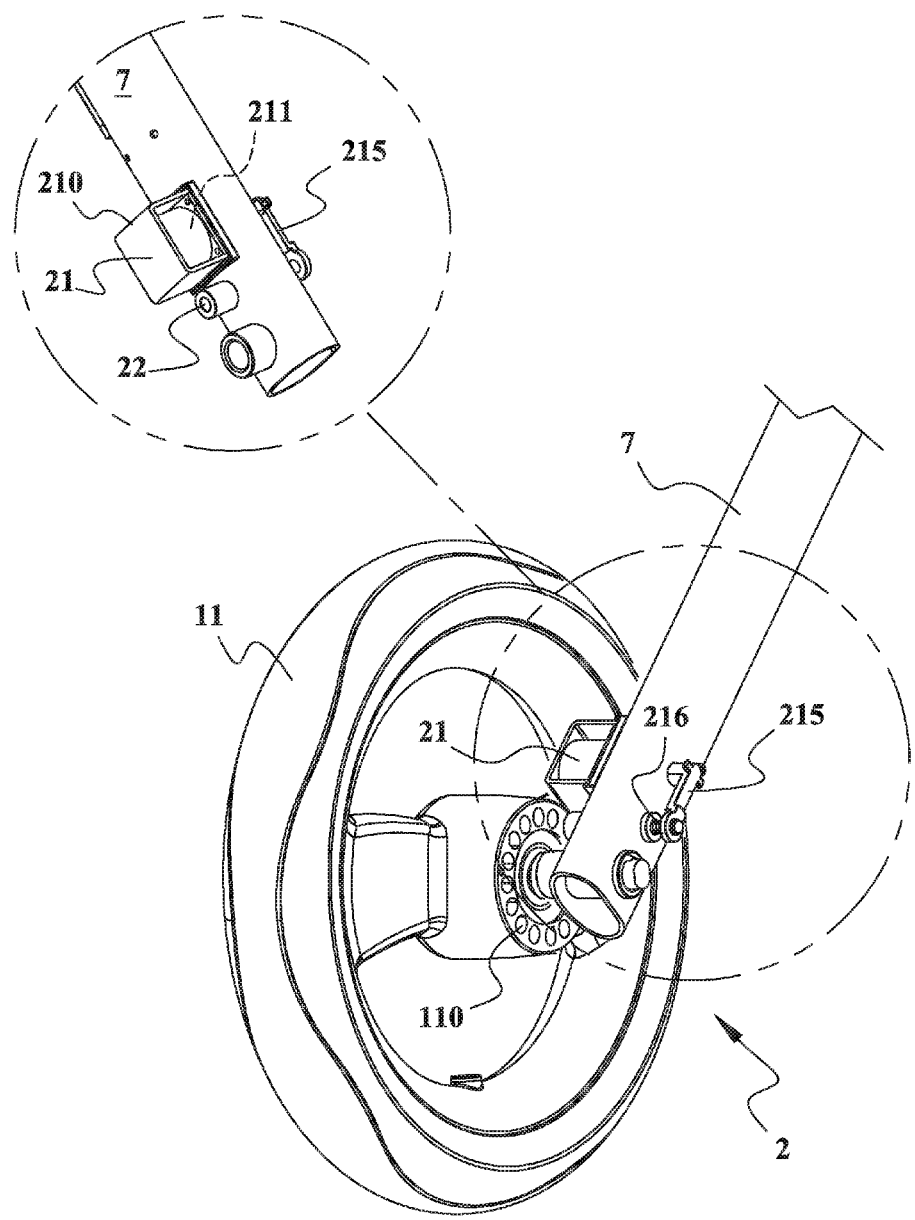
FIG. 6 is a perspective view showing the assembly of the first locking mechanism and the first rear wheel.

Referring to FIGS. 2, 4 and 23, the battery 4 is mounted on the stroller frame 1 for providing a current to the first electromagnet 21 and the second electromagnet 31 via a power supply circuit 41.

Referring to FIG. 4, the hand-detecting handle 5 is mounted on a rear upper end of the stroller frame 1 and electrically couple to the power supply circuit 41. When the hand-detecting handle 5 detected a caregiver's hand is near, the hand-detecting handle 5 shall generate a first control signal 501 to the power supply circuit 41; and when the hand-detecting handle 5 detected the caregiver's hand is absent, he hand-detecting handle 5 shall generate a second control signal 502 to the power supply circuit 41.

Once the power supply circuit 41 has received the first control signal 501 (i.e., the hand-detecting handle 5 has detected a caregiver's hand is near) shall supply a first current in first direction 503 to the first electromagnet 21 and the second electromagnet 31, so as to drive the first locking pin 22 and the second locking pin 32 to disengage from the positioning holes 110 (120) thereby unlocking the first rear wheel 11 and the second rear wheel 12 automatically.

When the power supply circuit 41 has received the second control signal 502 (i.e., the hand-detecting handle 5 has detected that the caregiver's hand is absent) shall supply a second current in second direction 504 to the first electromagnet 21 and the second electromagnet 31 so as to drive the first locking pin 22 and the second locking pin 32 to engage with the positioning holes 110 (120) thereby locking the first rear wheel 11 and the second rear wheel 12 automatically.

Referring to FIG. 4 again, the hand-detecting handle 5 may comprise a metal tube 51, a cover layer 52 and a capacitance detecting circuit 53.

The metal tube 51 has at least one end connected to the rear upper end of the stroller frame 1, and the cover layer 52 may be embodied as a layer of foam material covered on the metal tube 51 for providing insulation and decoration with soft touch surface.

The capacitance detecting circuit 53 is electrically couple to the power supply circuit 41, and includes a micro control unit (MCU) for detecting a caregiver's hand by detecting and calculating a difference of capacitance, thereby generating a first control signal 501 when detected a caregiver's hand is near, and generating a second control signal 502 when detected the caregiver's hand is absent.

Referring again to FIGS. 3 and 12, the first electromagnet 21 and the second electromagnet 31 each may comprise a housing frame 210 (310), a coil 211 (311), a movable plunger 212 (312), a permanent magnet 213 (313) and a return spring 214 (314).

The housing frame 210 (310) may be made of metal material and fixedly mounted on the rear strut 7 of the stroller frame 1. The coil 211 (311) is fixedly positioned inside the housing frame 210 (310) and electrically couple to the power supply circuit 41 for generating a first magnetic force in first direction 5031 (as the arrow schematically shown in FIG. 7) when the power supply circuit 41 provides the first current in first direction 503, and generating a second magnetic force in second direction 5032 (as the arrow schematically shown in FIG. 8) when the power supply circuit 41 provides the second current in first direction 504.

The movable plunger 212 (312) is slidably and retractably sleeved within the coil 211 (311), and capable of moving to a first position by the first magnetic force in first direction 5031, and moving to a second position by the second magnetic force in second direction 5032.

The permanent magnet 213 (313) is mounted inside the housing frame 210 (310) and near one end of the coil 211 (311). Once the movable plunger 212 (312) has moved full travel and contacted the permanent magnet 213 (313) will be held by a magnet's attraction force of the permanent magnet 213 (313) thereby retaining the movable plunger 212 (312) in the second position without providing any further current from the power supply circuit 41.

Figure 7:
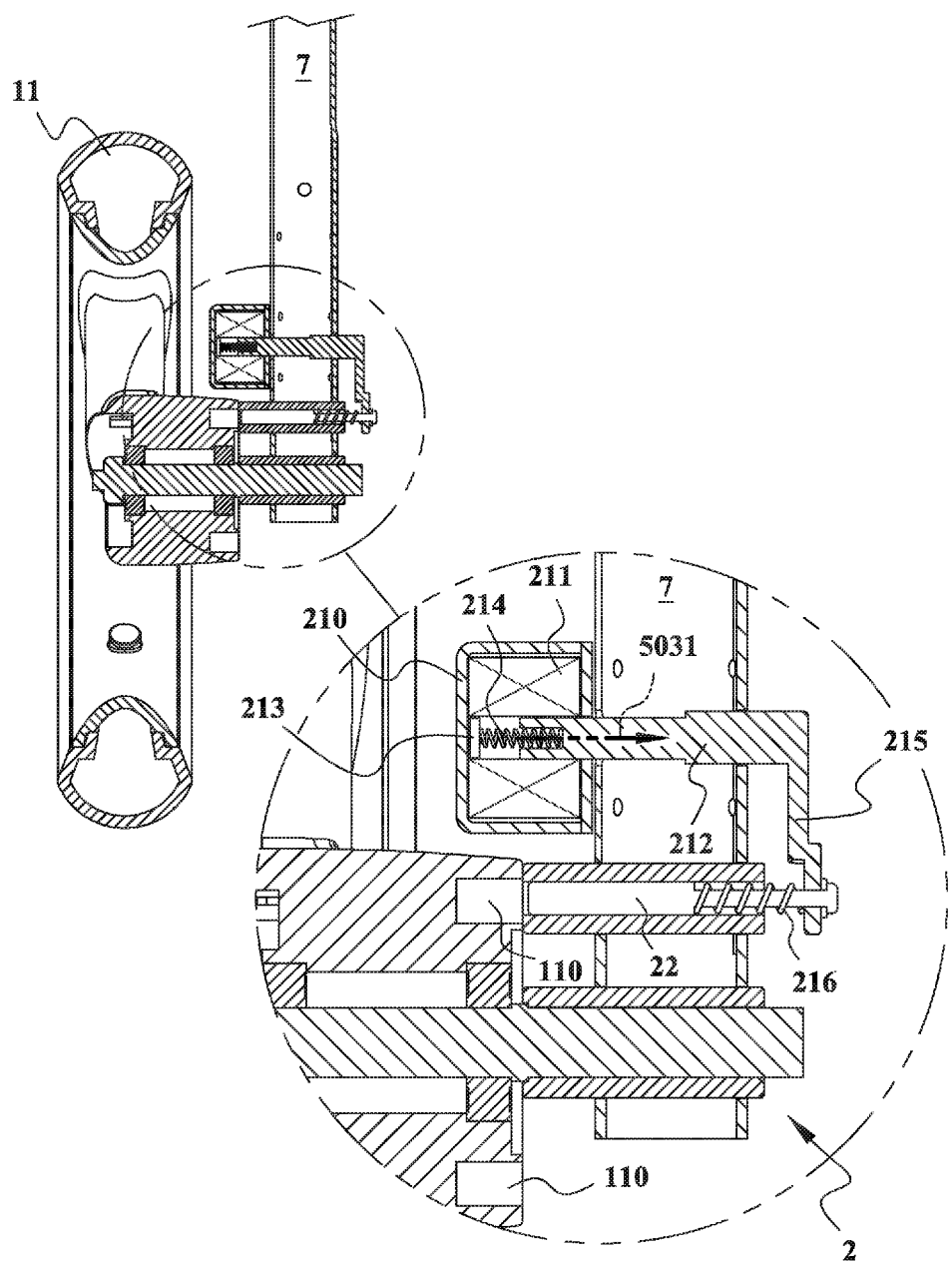
FIG. 7 is a cross-sectional view showing how the first locking mechanism is operated to unlock the first rear wheel by providing a first current in first direction from the power supply circuit (when the caregiver's hand has been left the hand-detecting handle).

The return spring 214 (314) is installed between the permanent magnet 213 (313) and the movable plunger 212 (312) for biasing the movable plunger 212 (312) toward a direction away from the permanent magnet 213 (313). As shown in FIG. 7, once the first magnetic force in first direction 5031 is increased enough to overcome the magnet's attraction force of the permanent magnet 213 (313), the movable plunger 212 (312) shall be biased and driven by the return spring 214 (314) to the first position and then be kept in the first position without providing any further current from the power supply circuit 41.

The movable plungers 212 (312) are associated with the first locking pin 22 and the second locking pin 32 respectively. When each of the movable plungers 212 (312) is driven by the first magnetic force in first direction 5031 and kept in the first position by the return spring 214 (314), the first locking pin 22 and the second locking pin 32 shall be associated to disengage from the positioning holes 110 (120) of the first rear wheel 11 and the second rear wheel 12 respectively so as to unlock the first rear wheel 11 and the second rear wheel 12.

Figure 8:
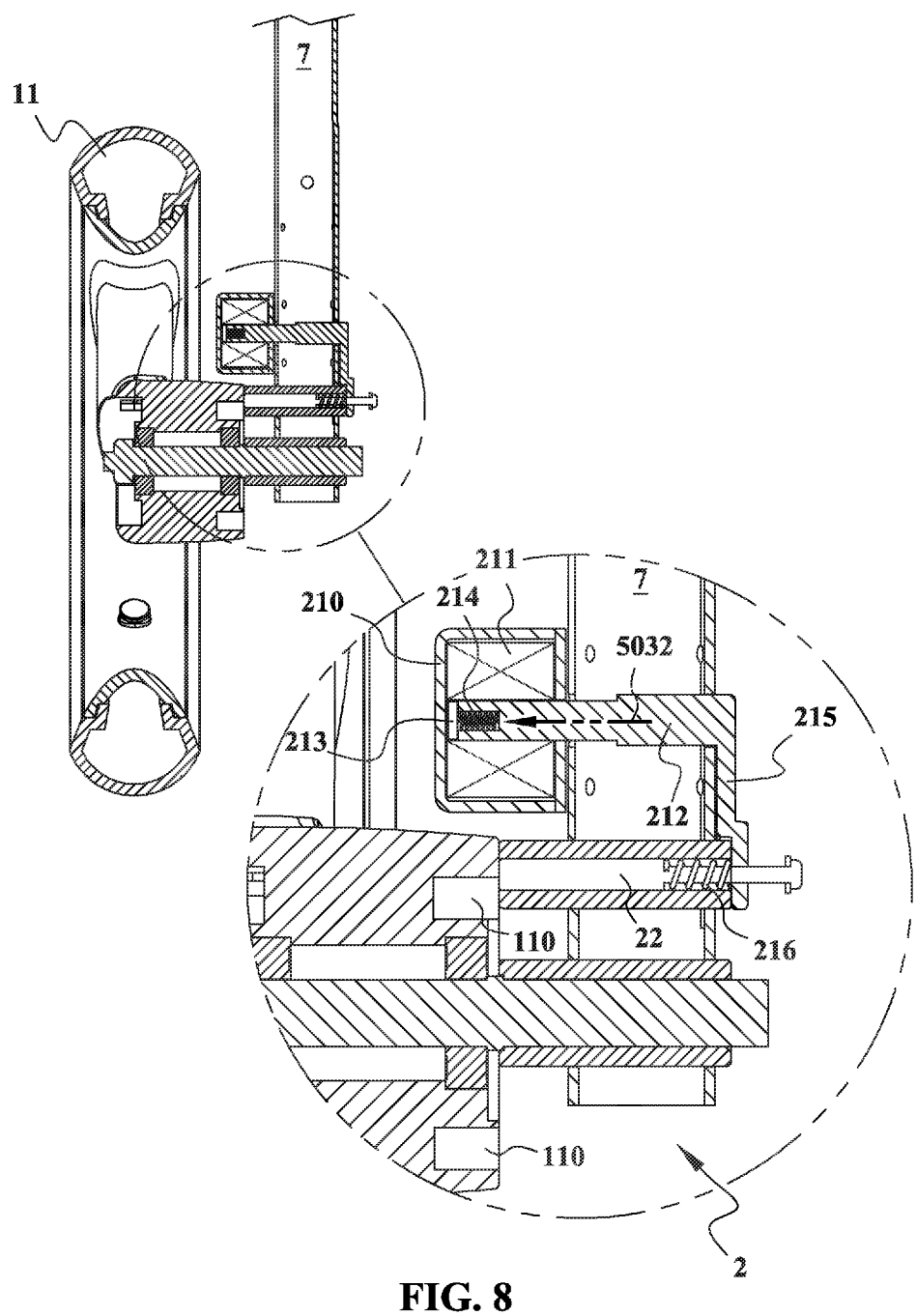
FIG. 8 is a cross-sectional view showing how the first locking mechanism is operated to lock the first rear wheel by providing a second current in second direction from the power supply circuit (when the caregiver's hand is near the hand-detecting handle).
Figure 9:
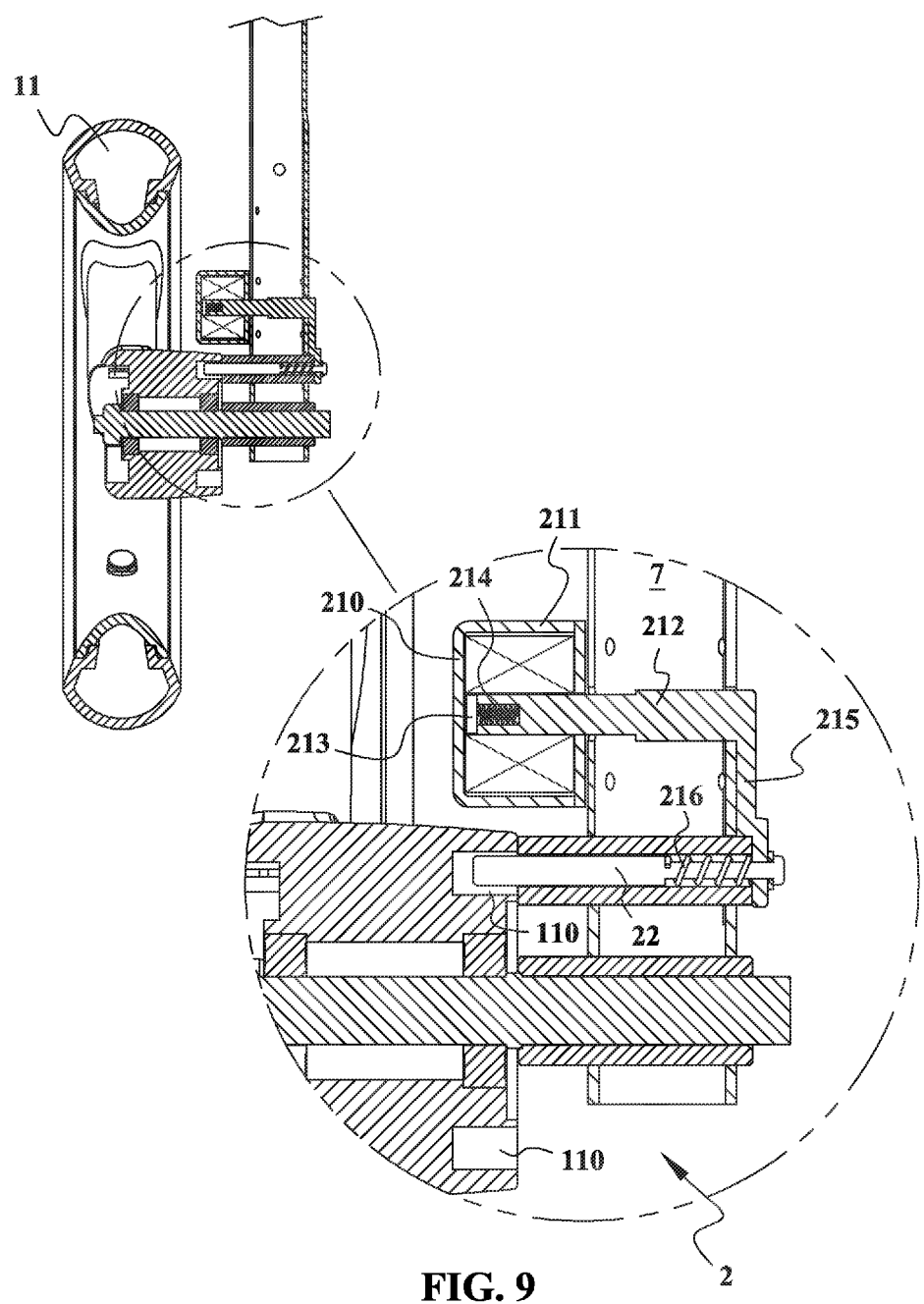
FIG. 9 is a cross-sectional view showing the first locking mechanism has locked the first rear wheel after being provided a second current in second direction from the power supply circuit (when the caregiver's hand is near the hand-detecting handle).
Figure 10:
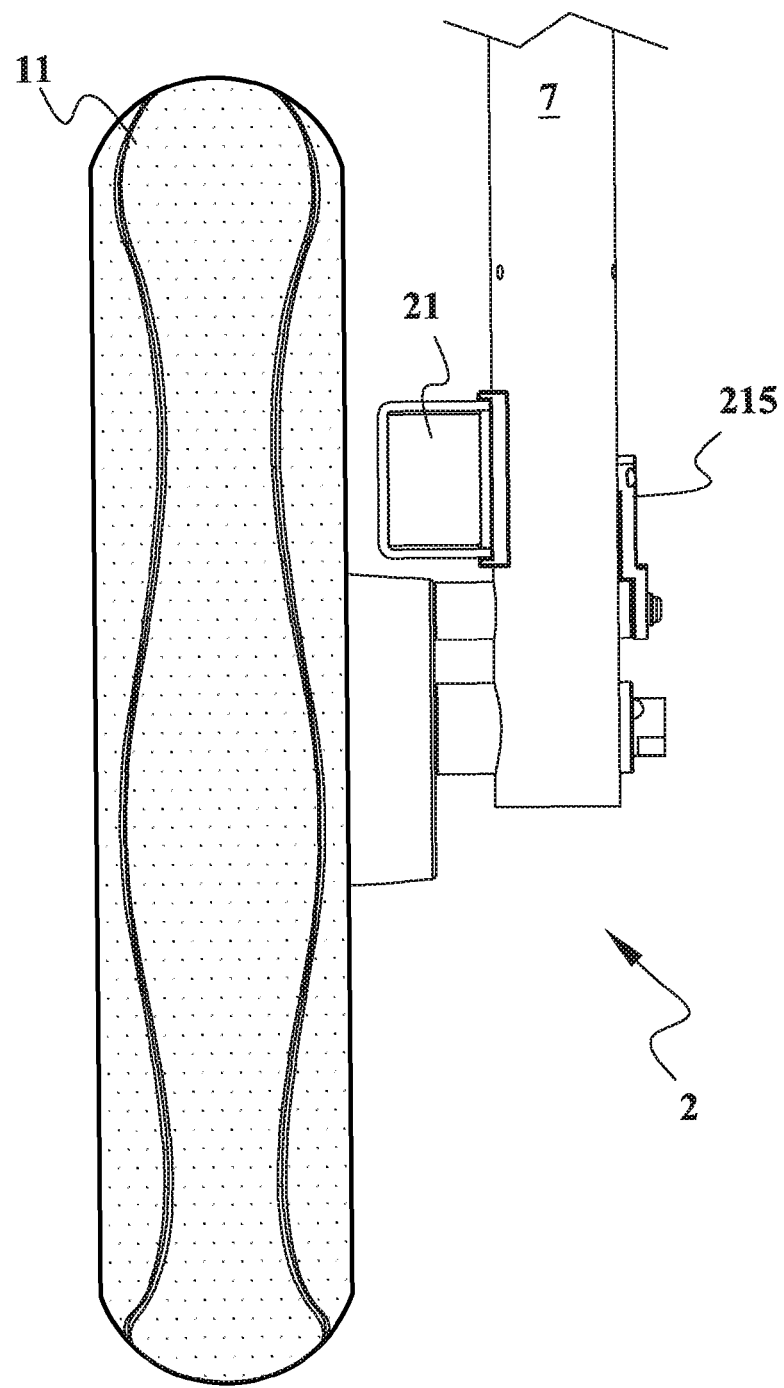
FIG. 10 is an elevational view depicting the first locking mechanism has locked the first rear wheel (when the caregiver's hand is near the hand-detecting handle).
Figure 11:
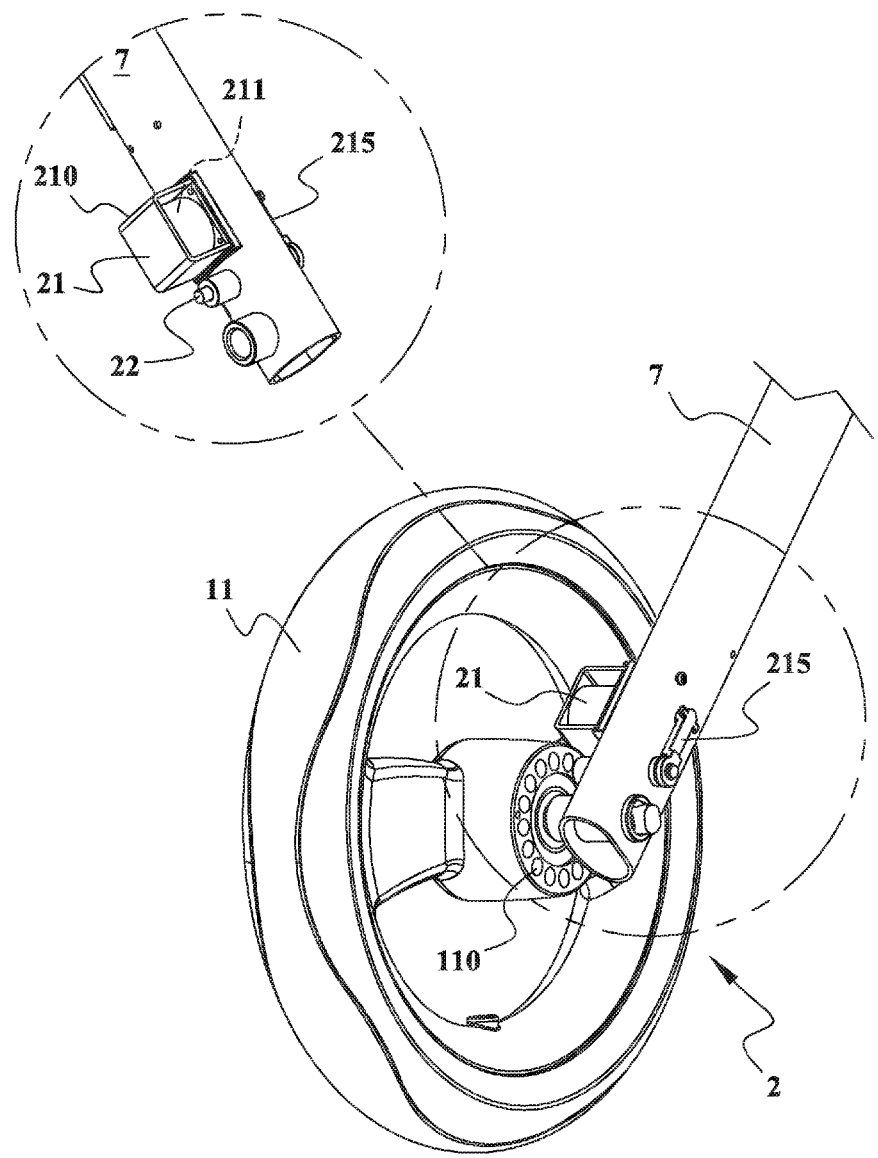
FIG. 11 is perspective view depicting the first locking mechanism has locked the first rear wheel (when the caregiver's hand is near the hand-detecting handle).

Referring to FIGS. 8 and 9, as the movable plungers 212 (312) are associated with the first locking pin 22 and the second locking pin 32 respectively, when each of the movable plungers 212 (312) is driven by the second magnetic force in second direction 5032 to overcome the return spring 214 (314) and held by the magnet's attraction force of the permanent magnet 213 (313) in the second position, the first locking pin 22 and the second locking pin 32 shall be associated to engage with the positioning holes 110 (120) of the first rear wheel 11 and the second rear wheel 12 respectively so as to lock the first rear wheel 11 and the second rear wheel 12.

For saving energy, it is preferably while the movable plungers 212 (312) has been moved to the second position and held by the magnet's attraction force of the permanent magnet 213 (313), the power supply circuit 41 shall stop to provide the second current in second direction 504 to the first electromagnet 21 and the second electromagnet 31. In same concept, it is also preferably when the movable plungers 212 (312) has been moved to and kept by the return spring 214 (314) in the first position, the power supply circuit 41 shall stop to provide the first current in first direction 503 to the first electromagnet 21 and the second electromagnet 31.

Referring again to FIGS. 7 to 9, the movable plungers 212 (312) are associated with the first locking pin 22 and the second locking pin 32 respectively by an associating arm 215 (315) and a compression spring 216 (316). The associating arm 215 (315) has one end connected with the movable plunger 212 (312), and another end connected with the compression spring 216 (316).

In this embodiment, the first locking pin 22 and the second locking pin 32 each has one end abutted by the compression spring 216 (316) so as to engage with the positioning holes 110 (120) of the first rear wheel 11 and the second rear wheel 12.

As the first locking pin 22 and the second locking pin 32 are not always aligned with one of the positioning holes 110 (120), when the movable plungers 212 (312) is moved to the second position, the compression springs 216 (316) shall bias the first locking pin 22 and the second locking pin 32 toward the positioning holes 110 (120) of the first rear wheel 11 and the second rear wheel 12 respectively. The first locking pin 22 and the second locking pin 32 shall be kept abutting on the side walls of the first rear wheel 11 and the second rear wheel 12 until being aligned and engaged with one of the positioning holes 110 (120).

Figure 12:
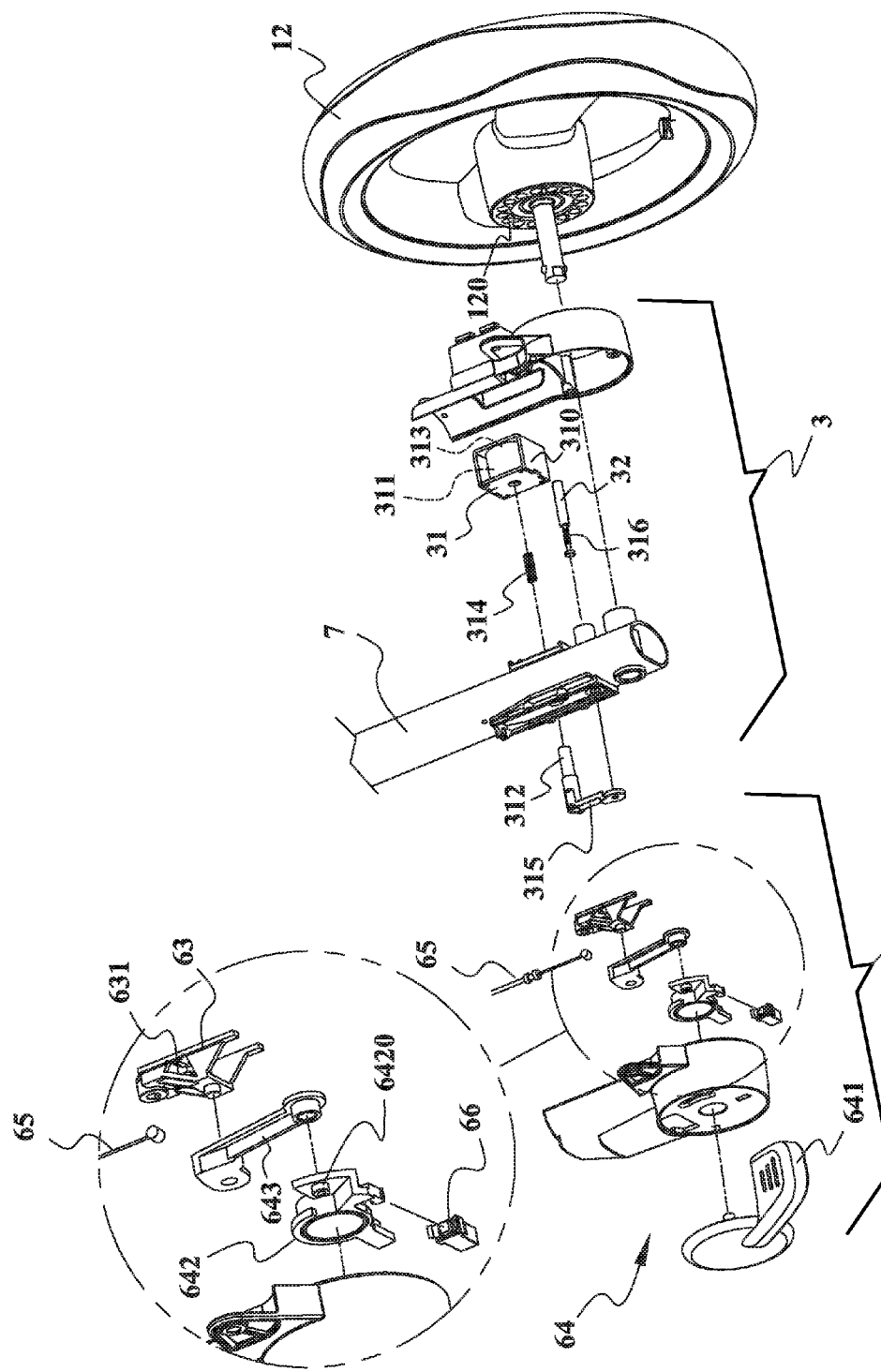
FIG. 12 is an exploded view of a second locking mechanism and a second rear wheel according to the present invention.
Figure 13:
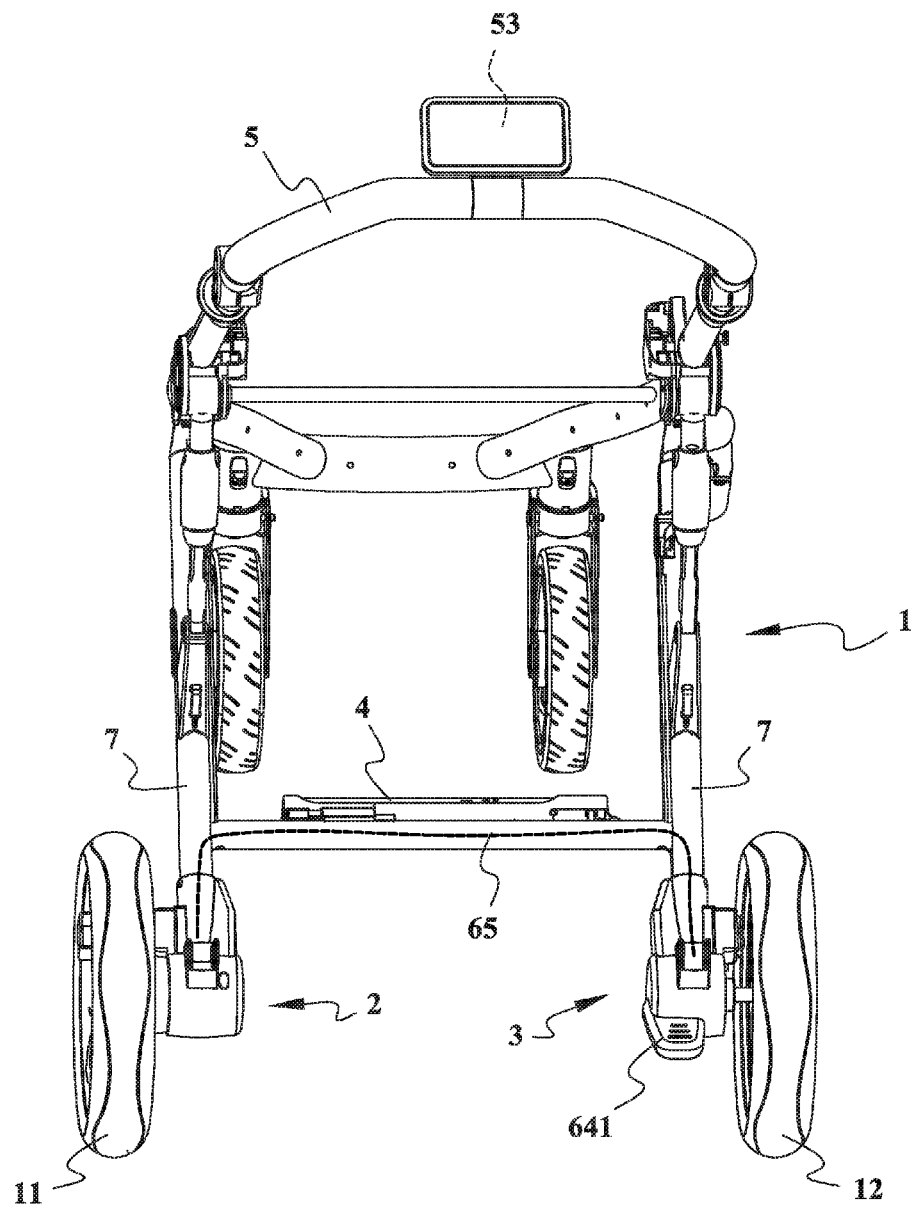
FIG. 13 is a rear elevational view showing the association between the first locking mechanism and the second locking mechanism.

The automatic brake mechanism according to the present invention may further include a step-driving mechanism 6 for operating by foot. Referring to FIGS. 12 to 13, the step-driving mechanism 6 may include a first sliding mount 62, a second sliding mount 63, an associating element 65 and a pedal mechanism 64.

The first sliding mount 62 is slidably mounted on the first side of the stroller frame 1 and capable of driving the movable plungers 212 of the first locking mechanism 2 by sliding, so as to move the movable plungers 212 to the second position so as to lock the first rear wheel 11.

The first sliding mount 62 may be characterized by having formed with a first slant face 621 for slidably abutting with one end of the movable plungers 212 of the first locking mechanism 2 thereby driving the movable plungers 212 of the first locking mechanism 2 by sliding.

The second sliding mount 63 is slidably mounted on the second side of the stroller frame 1 and capable of driving the movable plungers 312 of the second locking mechanism 3 by sliding, so as to move the movable plungers 312 to the second position so as to lock the second rear wheel 12.

The second sliding mount 63 may be characterized by having formed with a second slant face 631 for slidably abutting with one end of the movable plungers 312 of the second locking mechanism 3 thereby driving the movable plungers 312 of the second locking mechanism 3 by sliding.

The associating element 65 associated between the first sliding mount 62 and the second sliding mount 63. In this embodiment, the associating element 65 may be embodied as a wire connected between the first sliding mount 62 and the second sliding mount 63.

The pedal mechanism 64 is operatively mounted on the second side of the stroller frame 1 for driving the second sliding mount 63 and associating the first sliding mount 62 to slide simultaneously so as to lock the first rear wheel 11 and the second rear wheel 12 in the same time.

Figure 3:
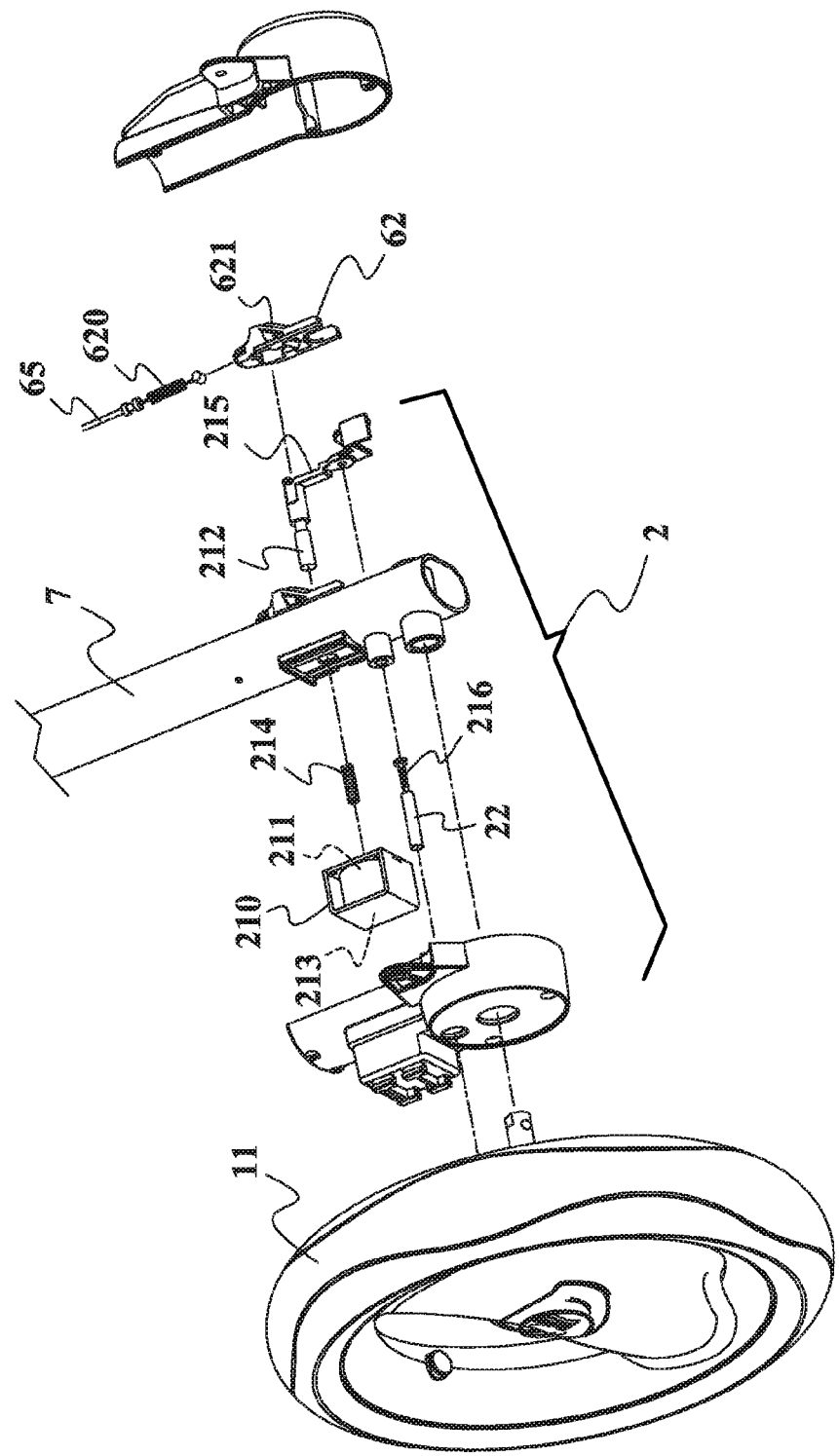
FIG. 3 is an exploded view of a first locking mechanism and a first rear wheel according to the present invention.

Preferably, the associating element 65 may be biased by a resilient element 620 (as shown in FIG. 3) to pull the first sliding mount 62 so as to release the movable plungers 212 of the first locking mechanism 2 from the second position to the first position.

The pedal mechanism 64 of the present embodiment may include a pedal 641, a swingable element 642 and a force-transmitting arm 643. Referring again to FIG. 12, the pedal 641 is rotatably mounted outside the second locking mechanism 3, and the swingable element 642 rotatably mounted inside the second locking mechanism 3 and connected and driven by the pedal 641.

The force-transmitting arm 643 has one end pivoted with the second sliding mount 63 and an opposite end pivoted with the swingable element 642 at a pivot point 6420.

When the pedal 641 is stepped to rotate downward, shall drive the swingable element 642 to rotate and drive the second sliding mount 63 to slide thereby moving the movable plungers 312 of the second locking mechanism 3 to the second position; in the same time, the first sliding mount 62 shall be associated by the associating element 65 to slide and move the movable plungers 212 of the first locking mechanism 2 to the second position thereof, so as to lock the first rear wheel 11 and the second rear wheel 12 by foot stepping operation simultaneously.

The pedal mechanism 64 may further include a retaining catch device 66 for releasably engaging and keeping the swingable element 642 in an angle that capable of keeping the movable plungers 312 of the second locking mechanism 3 in the second position to lock to lock the first rear wheel 11 and the second rear wheel 12. The caregiver may be disengaged the swingable element 642 from the retaining catch device 66 by lifting up and restore the position of the pedal 641, so as to unlock the first rear wheel 11 and the second rear wheel 12 either by foot or by hand.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A stroller frame with an automatic brake mechanism actuatable by hand detecting including:
    a first rear wheel (11) being rotatably mounted at a first side of the stroller frame (1) and formed with a plurality of positioning holes (110);
    a first locking mechanism (2) having a first electromagnet (21) and a first locking pin (22) driven by the first electromagnet (21) for engaging with and disengaging from the positioning holes (110) of the first rear wheel (11) so as to lock and unlock the first rear wheel (11);
    a second rear wheel (12) being rotatably mounted at a second side of the stroller frame (1) and formed with a plurality of positioning holes (120);
    a second locking mechanism (3) having a second electromagnet (31) and a second locking pin (32) driven by the second electromagnet (31) for engaging with and disengaging from the positioning holes (120) of the second rear wheel (12) so as to lock and unlock the second rear wheel (12);
    a battery (4) for providing current to the first electromagnet (21) and the second electromagnet (31) via a power supply circuit (41); and
    a hand-detecting handle (5) mounted on a rear upper end of the stroller frame (1) and being electrically coupled to the power supply circuit (41) for generating a first control signal (501) when detecting contact by a caregiver's hand, and generating a second control signal (502) when detecting no contact by the caregiver's hand;
    wherein the power supply circuit (41) shall supply a first current in first direction (503) to the first electromagnet (21) and the second electromagnet (31) when received the first control signal (501), so as to drive the first locking pin (22) and the second locking pin (32) to disengage from the positioning holes (110)(120) thereby unlocking the first rear wheel (11) and the second rear wheel (12) automatically; and
    wherein the power supply circuit (41) shall supply a second current in second direction (504) to the first electromagnet (21) and the second electromagnet (31) when receiving the second control signal (502), so as to drive the first locking pin (22) and the second locking pin (32) to engage with the positioning holes (110)(120) thereby locking the first rear wheel (11) and the second rear wheel (12) automatically.

2. The stroller frame with an automatic brake mechanism according to claim 1, wherein the hand-detecting handle (5) including:
- a metal tube (51) connected to the rear end of the stroller frame (1);
- a cover layer (52) covered on the metal tube (51); and
- a capacitance detecting circuit (53) electrically coupled to the power supply circuit (41), having a micro control unit (MCU) for detecting the caregiver's hand by calculating a difference of capacitance, thereby generating a first control signal (501) when detecting contact by a caregiver's hand, and generating a second control signal (502) when detecting no contact by the caregiver's hand.

3. The stroller frame with an automatic brake mechanism according to claim 2, wherein the first electromagnet (21) and the second electromagnet (31) each comprises:
- a housing frame (210)(310) fixedly mounted on the stroller frame (1);
- a coil (211) (311) positioned inside the housing frame (210)(310) and electrically coupled to the power supply circuit (41) for generating a first magnetic force in first direction (5031) when the power supply circuit (41) provides the first current in first direction (503), and generating a second magnetic force in second direction (5032) when the power supply circuit (41) provides the second current in first direction (504);
- movable plungers (212)(312) slidably and retractably sleeved within the coil (211) (311), and capable of moving to a first position by the first magnetic force in first direction (5031), and moving to a second position by the second magnetic force in second direction (5032);
- a permanent magnet (213)(313) mounted inside the housing frame (210)(310) and near one end of the coil (211) (311); wherein once the movable plungers (212)(312) have moved full travel and contacted the permanent magnet (213)(313) will be held by a magnet's attraction force of the permanent magnet (213)(313), so as to retain the movable plungers (212)(312) in the second position without providing any further current from the power supply circuit (41); and
- a return spring (214)(314) for biasing the movable plungers (212)(312) toward a direction away from the permanent magnet (213)(313), wherein once the first magnetic force in first direction (5031) is increased and overcome the magnet's attraction force of the permanent magnet (213)(313), the movable plungers (212)(312) are biased and driven by the return spring (214)(314) so as to be kept in the first position without providing any further current from the power supply circuit (41).

4. The stroller frame with an automatic brake mechanism according to claim 3, wherein the movable plungers (212) (312) are associated with the first locking pin (22) and the second locking pin (32) respectively, and wherein when each of the movable plungers (212)(312) is driven by the first magnetic force in first direction (5031) and kept in the first position by the return spring (214)(314), the first locking pin (22) and the second locking pin (32) shall be associated to disengage from the positioning holes (110)(120) of the first rear wheel (11) and the second rear wheel (12) respectively so as to unlock the first rear wheel (11) and the second rear wheel (12).

5. The stroller frame with an automatic brake mechanism according to claim 3, wherein the movable plungers (212) (312) are associated with the first locking pin (22) and the second locking pin (32) respectively, and wherein when each of the movable plungers (212)(312) is driven by the second magnetic force in second direction (5032) to overcome the return spring (214)(314) and held by the magnet's attraction force of the permanent magnet (213)(313) in the second position, the first locking pin (22) and the second locking pin (32) shall be associated to engage with the positioning holes (110) (120) of the first rear wheel (11) and the second rear wheel (12) respectively so as to lock the first rear wheel (11) and the second rear wheel (12).

6. The stroller frame with an automatic brake mechanism according to claim 3, wherein the movable plungers (212) (312) are associated with the first locking pin (22) and the second locking pin (32) respectively by an associating arm (215)(315) and a compression spring (216)(316), wherein the associating arm (215)(315) has one end connected with the movable plunger (212)(312), and another end connected with the compression spring (216)(316); and wherein the first locking pin (22) and the second locking pin (32) each has one end abutted by the compression spring (216)(316) so as to engage with the positioning holes (110)(120) of the first rear wheel (11) and the second rear wheel (12); when the movable plungers (212)(312) is moved to the second position, the compression springs (216)(316) shall bias the first locking pin (22) and the second locking pin (32) to move toward the positioning holes (110)(120) of the first rear wheel (11) and the second rear wheel (12) respectively.

7. The stroller frame with an automatic brake mechanism according to claim 3, wherein when the movable plungers (212)(312) has been moved to the second position and held by the magnet's attraction force of the permanent magnet (213) (313), the power supply circuit (41) shall stop to provide the second current in second direction (504) to the first electromagnet (21) and the second electromagnet (31).

8. The stroller frame with an automatic brake mechanism according to claim 3, wherein when the movable plungers (212)(312) is moved to and kept by the return spring (214) (314) in the first position, the power supply circuit (41) shall stop to provide the first current in first direction (503) to the first electromagnet (21) and the second electromagnet (31).

9. The stroller frame with an automatic brake mechanism according to claim 3, further including a step-driving mechanism (6) which comprising:
- a first sliding mount (62), slidably mounted on the first side of the stroller frame (1) and capable of driving the movable plungers (212) of the first locking mechanism (2) by sliding, so as to move the movable plungers (212) to the second position so as to lock the first rear wheel (11);
- a second sliding mount (63), slidably mounted on the second side of the stroller frame (1) and capable of driving the movable plungers (312) of the second locking mechanism (3) by sliding, so as to move the movable plungers (312) to the second position so as to lock the second rear wheel (12);
- an associating element (65) associated between the first sliding mount (62) and the second sliding mount (63); and
- a pedal mechanism (64) operatively mounted on the second side of the stroller frame (1) for driving the second sliding mount (63) and associating the first sliding mount (62) to slide simultaneously so as to lock the first rear wheel (11) and the second rear wheel (12) in the same time.

10. The stroller frame with an automatic brake mechanism according to claim 9, wherein the associating element (65) is a wire connected between the first sliding mount (62) and the second sliding mount (63).

11. The stroller frame with an automatic brake mechanism according to claim 9, wherein the first sliding mount (62) is formed with a first slant face (621) for slidably abutting with one end of the movable plungers (212) of the first locking mechanism (2) thereby driving the movable plungers (212) of the first locking mechanism (2) by sliding.

12. The stroller frame with an automatic brake mechanism according to claim 9, wherein the second sliding mount (63) is formed with a second slant face (631) for slidably abutting with one end of the movable plungers (312) of the second locking mechanism (3) thereby driving the movable plungers (312) of the second locking mechanism (3) by sliding.

13. The stroller frame with an automatic brake mechanism according to claim 9, wherein the associating element (65) is biased by a resilient element (620) to pull the first sliding mount (62) so as to release the movable plungers (212) of the first locking mechanism (2) from the second position to the first position.

14. The stroller frame with an automatic brake mechanism according to claim 9, wherein the pedal mechanism (64) including:
- a pedal (641) rotatably mounted outside the second locking mechanism (3);
- a swingable element (642) rotatably mounted inside the second locking mechanism (3) and connected and driven by the pedal (641); and
- a force-transmitting arm (643) having an end pivoted with the second sliding mount (63) and an opposite end pivoted with the swingable element (642) at a pivot point (6420); wherein when the pedal (641) is stepped to rotate downwardly, shall drive the swingable element (642) to rotate and drive the second sliding mount (63) to slide thereby moving the movable plungers (312) of the second locking mechanism (3) to the second position; in the same time, the first sliding mount (62) shall be associated by the associating element (65) to slide to move the movable plungers (212) of the first locking mechanism (2) to the second position thereof, so as to lock the first rear wheel (11) and the second rear wheel (12) by foot stepping operation simultaneously.

15. The stroller frame with an automatic brake mechanism according to claim 14, wherein the pedal mechanism (64) further includes a retaining catch device (66) for releasably engaging and keeping the swingable element (642) in an angle that is capable of keeping the movable plungers (312) of the second locking mechanism (3) in the second position.

* * * * *